United States Patent [19]
Edenfield et al.

[11] Patent Number: 5,155,824
[45] Date of Patent: Oct. 13, 1992

[54] SYSTEM FOR TRANSFERRING SELECTED DATA WORDS BETWEEN MAIN MEMORY AND CACHE WITH MULTIPLE DATA WORDS AND MULTIPLE DIRTY BITS FOR EACH ADDRESS

[75] Inventors: Robin W. Edenfield; William B. Ledbetter, Jr.; Russell A. Reininger, all of Austin, Tex.

[73] Assignee: Motorola, Inc., Schaumburg, Ill.

[21] Appl. No.: 351,899

[22] Filed: May 15, 1989

[51] Int. Cl.⁵ .................. G06F 12/12; G06F 7/10
[52] U.S. Cl. .................. 395/425; 364/243.41; 364/245.1; 364/252.5; 364/260.2; 364/266.3; 364/964.2; 364/958.2; 364/961.1; 364/964.342; 364/964.6; 364/DIG. 1; 395/250
[58] Field of Search ... 364/200 MS File, 900 MS File; 395/250, 425

[56] References Cited

U.S. PATENT DOCUMENTS

| | | | |
|---|---|---|---|
| 4,713,755 | 12/1987 | Worley, Jr. et al. | 364/200 |
| 4,811,209 | 3/1989 | Rubiustein | 364/200 |
| 4,858,111 | 8/1989 | Steps | 364/200 |
| 4,860,192 | 8/1989 | Sachs et al. | 364/200 |
| 4,910,656 | 3/1990 | Scales, III et al. | 364/200 |
| 4,928,239 | 5/1990 | Baum et al. | 364/200 |
| 4,939,641 | 7/1990 | Schwartz et al. | 364/200 |
| 4,995,041 | 2/1991 | Hetherington et al. | 371/40.1 |
| 4,996,641 | 2/1991 | Talgram et al. | 364/200 |
| 5,067,078 | 11/1991 | Talgram et al. | 395/400 |

Primary Examiner—Thomas C. Lee
Assistant Examiner—Ken S. Kim
Attorney, Agent, or Firm—Charlotte B. Whitaker

[57] ABSTRACT

A data cache capable of operation in a write-back (copyback) mode. The data cache design provides a mechanism for making the data cache coherent with memory, without writing the entire cache entry to memory, thereby reducing bus utilization. Each data cache entry is comprised of three items: data, a tag address, and a mixed size status field. The mixed size status fields provide one bit to indicate the validity of the data cache entry and multiple bits to indicate if the entry contains data that has not been written to memory (dirtiness). Multiple dirty bits provide a data cache controller with sufficient information to minimize the number of memory accesses used to unload a dirty entry. The data cache controller uses the multiple dirty bits to determine the quantity and type of accesses required to write the dirty data to memory. The portions of the entry being replaced that are clean (unmodified) are not written to memory.

10 Claims, 4 Drawing Sheets

SYSTEM FOR TRANSFERRING SELECTED DATA WORDS BETWEEN MAIN MEMORY AND CACHE WITH MULTIPLE DATA WORDS AND MULTIPLE DIRTY BITS FOR EACH ADDRESS

FIELD OF THE INVENTION

This invention relates generally to a data cache, and more specifically to a mechanism for making a data cache coherent with external memory without writing the entire cache entry to memory.

BACKGROUND OF THE INVENTION

Conservation of bus bandwidth becomes a significant design consideration as microprocessor speeds increase. These faster microprocessors make increasing demands on the memory system, and multiple processors and DMA devices which share the system bus. The M68000 family of microprocessors typically utilize 90–95% of the external bus bandwidth, due to the highly efficient, pipelined internal architecture of the central processing unit (CPU). In some systems, the problem of insufficient bus bandwidth has been addressed by using caching schemes, particularly caches that accommodate large data entries (i.e. significantly larger than the bus size).

Caching schemes have been employed by computer designers to reduce access times by a CPU to main memory, and hence, increase system performance. In many computing systems, main memory consists of a large array of memory devices with speeds which are slow relative to processor speeds. During accesses to main memory, the processor is forced to insert additional wait states to accommodate the slower memory devices. System performance during memory accesses can be enhanced with a cache. Smaller in size than main memory and significantly faster, the cache provides fast local storage for data and instruction code which is frequently used by the processor. In computing systems with caches, memory operations by the processor are first transacted with the cache. The slower main memory is only accessed by the processor if the memory operation cannot be completed with the cache. In general, the processor has a high probability of fulfilling a majority of its memory operations with the cache. Consequently in computing systems which employ a cache, effective memory access times between a processor and relatively slow main memory can be reduced.

Caches can be highly optimized according to a number of different features. One important feature which affects cache performance and design complexity is the handling of writes by the processor or an alternate bus master. Since two copies of a particular piece of data or instruction code can exist, one in main memory and a duplicate in the cache, writes to either main memory or the cache can result in incoherency between the two storage systems. For example, specific data is stored at a predetermined address in both the cache and main memory. During a processor write to the predetermined address, the processor first checks the contents of the cache for the data. After locating the data in the cache, the processor proceeds to write the new data into the cache at the predetermined address. As a result, the data is modified in the cache, but not in the main memory, and therefore, the cache and main memory become incoherent. Similarly, in systems with an alternate bus master, Direct Memory Access (DMA) writes to main memory by the alternate bus master modify data in the main memory but not in the cache. Once again, the cache and main memory become incoherent.

Incoherency between the cache and main memory during processor writes can be handled using two techniques. In a first technique, a "write-through" cache guarantees consistency between the cache and main memory by writing to both the cache and the main memory during processor writes. The contents of the cache and main memory are always identical, and so the two storage systems are always coherent. In a second technique, a "write-back" or "copy back" cache handles processor writes by writing only to the cache and setting a "dirty" bit to designate the cache entries which have been altered by the processor. A subsequent attempt by the processor to access the cache, which results in a cache "miss", can cause the replacement algorithm to select the dirty cache entry for replacement, and transfer the entire dirty (altered) cache entry to the main memory. The new data is written into the cache at the location vacated by the dirty entry.

In the prior art, there are several processors which operate in the copy back mode. These processors unload dirty cache entries by a write mode transfer of the entire cache line to the main memory. Since the cache entries are significantly larger than the system bus size, the burst write of the entire cache line to the main memory uses a significant portion of the bus bandwidth. Furthermore, processors of this type do not distinguish between the "clean" or unmodified portion, and the "dirty" or modified portion of the cache line. Essentially, these processors provide only one dirty bit and one valid bit per cache line. Consequently, the dirty status of a portion of the cache entry (i.e. one longword), results in a write of the entire cache line (i.e. four longwords) to the main memory. Thus, the bus bandwidth required to maintain the cache is greater, and bus utilization is inefficient.

SUMMARY OF THE INVENTION

Accordingly, it is an object of the present invention to provide a write back cache which increases bus efficiency by reducing bandwidth requirements for writes of replaced "dirty" entries to memory.

Another object of the present invention is to provide a write back cache capable of unloading variable sizes of cache entries.

Yet another object of the present invention is to provide a write back cache capable of unloading only the dirty portion of a cache entry corresponding to the size of the bus.

These and other objects of the present invention are achieved in a data processing system, comprising: a data processor; a memory for storing a plurality of data entries, identified by a plurality of memory addresses, and for providing the data entries to the processor; a first communications bus, for transferring the plurality of data entries between the memory and the data processor, in response to a first control signal; a bus controller; a cache, for storing in each of a plurality of cache lines an addressable data cache entry containing a plurality of bits of data, for receiving from the data processor a modified data entry, in a first write mode, and for transferring at least one of the plurality of bits of the addressable data entry to the memory, in a second write mode, the cache comprising: a register for storing in each of the plurality of cache lines the addressable data cache entry containing the plurality of bits of data, and for storing a first state entry, indicating that the cache line is valid, and a second state entry corresponding to each of the plurality of bits of data, indicating the plurality of bits of data is consistent or inconsistent with a data entry at a memory address corresponding to the addressable data cache entry; a plurality of buffers, coupled to the cache and the bus controller, for receiving the modified data entry from the cache and transferring the modified data entry to the memory, when the corresponding second state entry indicates that the plurality of bits of data is inconsistent with the data entry at the memory address corresponding to the addressable data entry, and for receiving a plurality of replacement data entries from the memory, and transferring the plurality of replacement data entries to the cache; and a cache controller, coupled to the plurality of buffers and the register, for reading the second state entry corresponding to each of the plurality of bits of data, for controlling the transfer of the modified data entry to the memory, and for controlling the transfer of the plurality of replacement data entries from the plurality of buffers to the cache.

DETAILED DESCRIPTION OF THE INVENTION

The terms "assert", "assertion", "negate" and "negation" will be used to avoid confusion when dealing with a mixture of "active high" and "active low" signals. "Assert" and "assertion" are used to indicate that a signal is rendered active, or logically true. "Negate" and "negation" are used to indicate that a signal is rendered inactive, or logically false.

Figure 1:
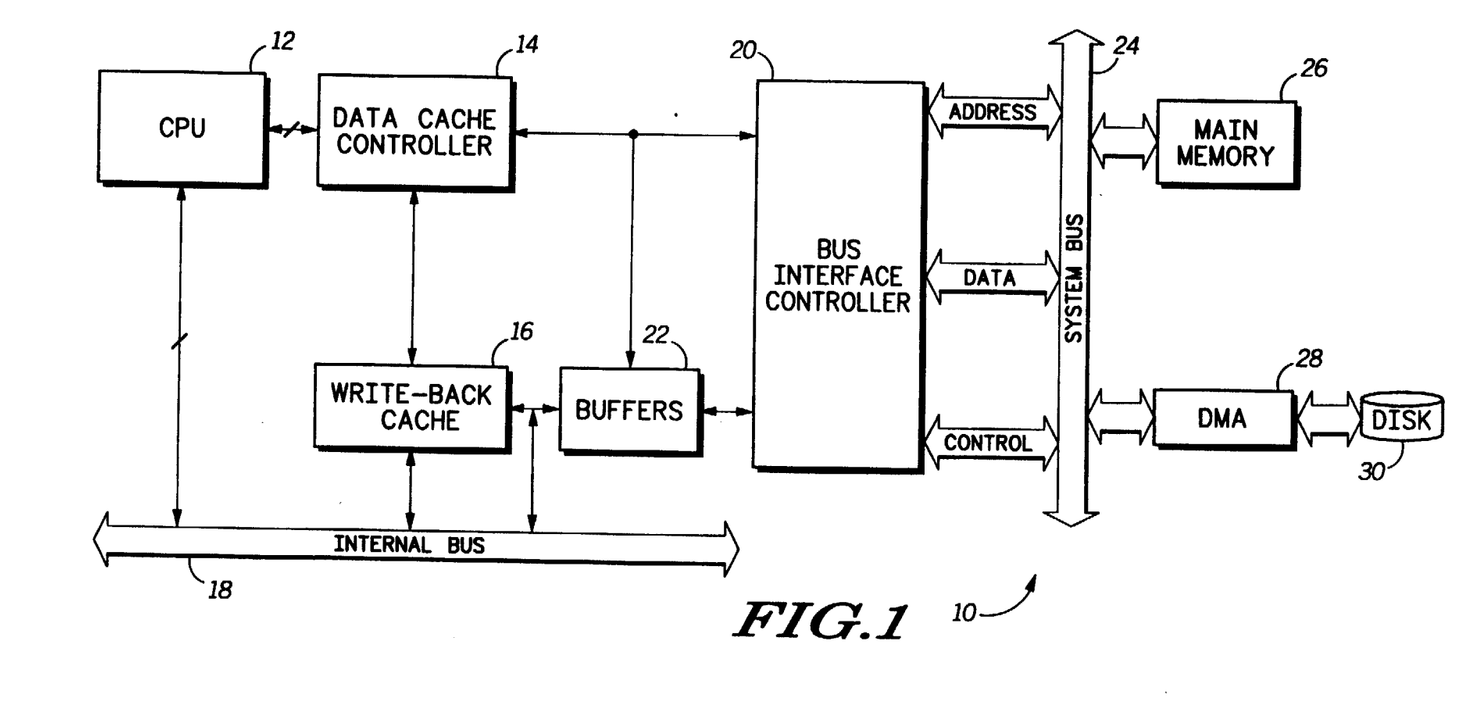
FIG. 1 is a block diagram illustrating a data processing system according to a preferred embodiment of the present invention.

Shown in FIG. 1 is a block diagram of a preferred embodiment of a data processing system 10, comprising a CPU 12, a data cache controller 14, a write-back cache 16, an internal bus 18, a bus interface controller 20, buffer 22, a system bus 24, a main memory 26, a DMA unit 28, and a disk 30. Data processing system 10 illustrates a typical uni-processor system, utilizing a single cache designed to support the present invention. In the illustrated form, CPU 12 is a first internal functional unit which executes a predetermined set of instructions. Data cache controller 14 is a second internal functional unit which receives control signals from bus interface controller 20, and CPU 12, and manages data transfers between write-back cache 16, CPU 12, and bus interface controller 20. Data cache controller 14 also supports bus snooping to maintain coherency between write-back cache 16 and main memory 26 by monitoring the system bus 24 when CPU 12 is not the current bus master, as disclosed in a co-pending application entitled "A Data Bus Snoop Controller for Concurrent Read and Invalidate Memory Operation" Ser. No. 07/351,898, by Bill Ledbetter et al, and assigned to the assignee hereof. Write-back cache 16 is a third functional unit coupled to the data cache controller 14, buffers 22, and the internal bus 18. Write-back cache 16 contains the appropriate logic necessary to read, write, update, invalidate, and flush the cache. In the preferred embodiment, the three internal functional units operate concurrently to provide the maximum sustained performance.

Figure 2:
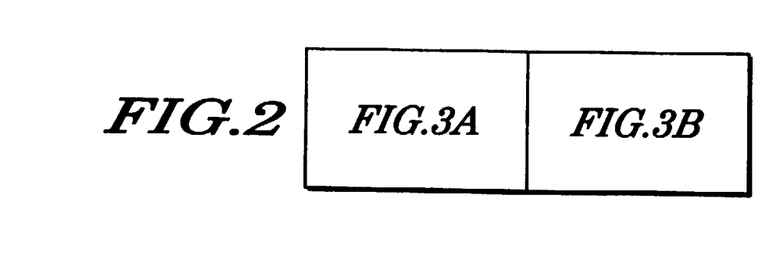
FIG. 2 is a diagram illustrating the orientation of FIG. 3A and 3B.
Figure 3A:
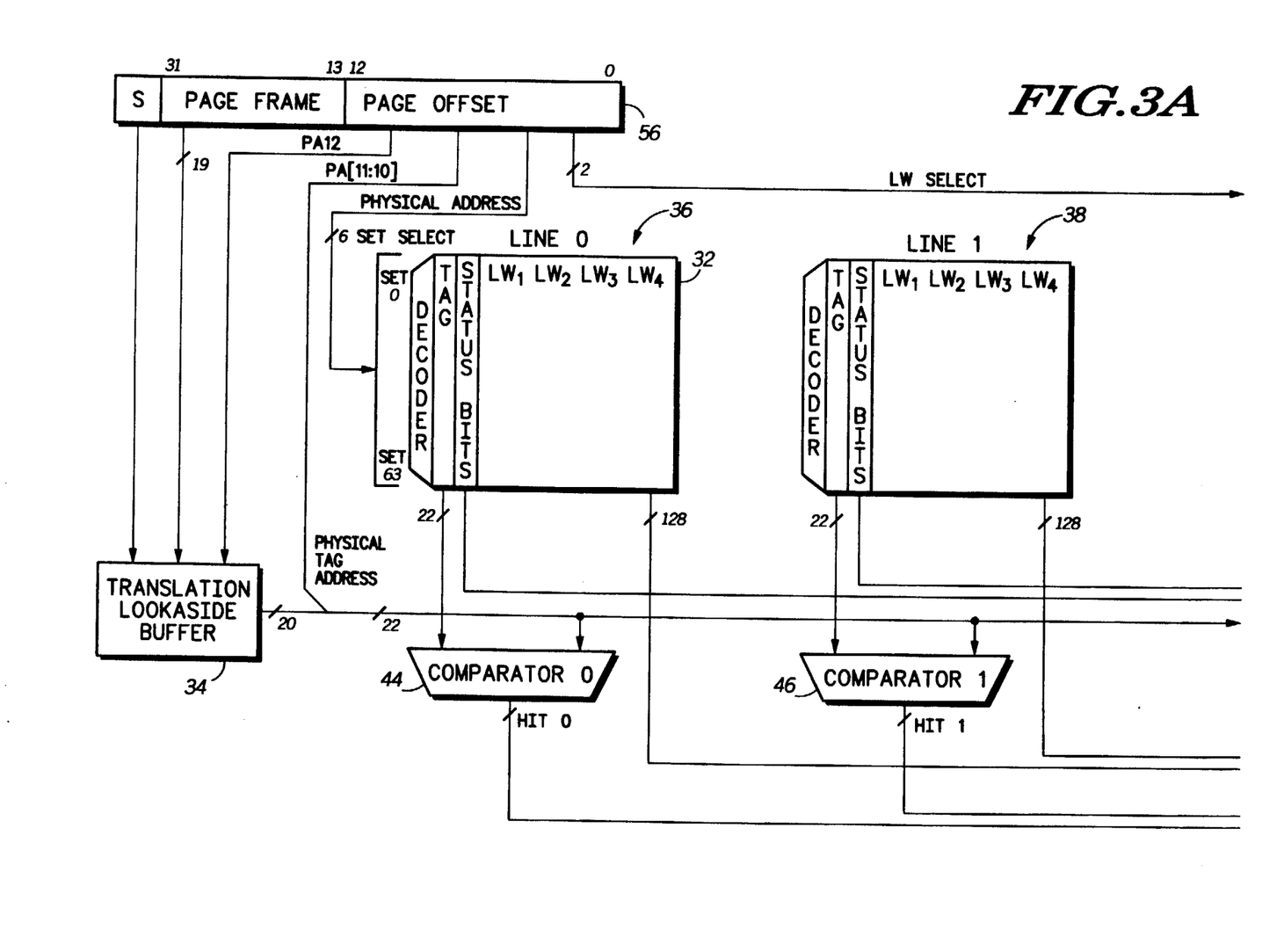
FIGS. 3A and 3B together are block diagrams illustrating a preferred embodiment of the write-back cache of FIG. 1.
Figure 3B:
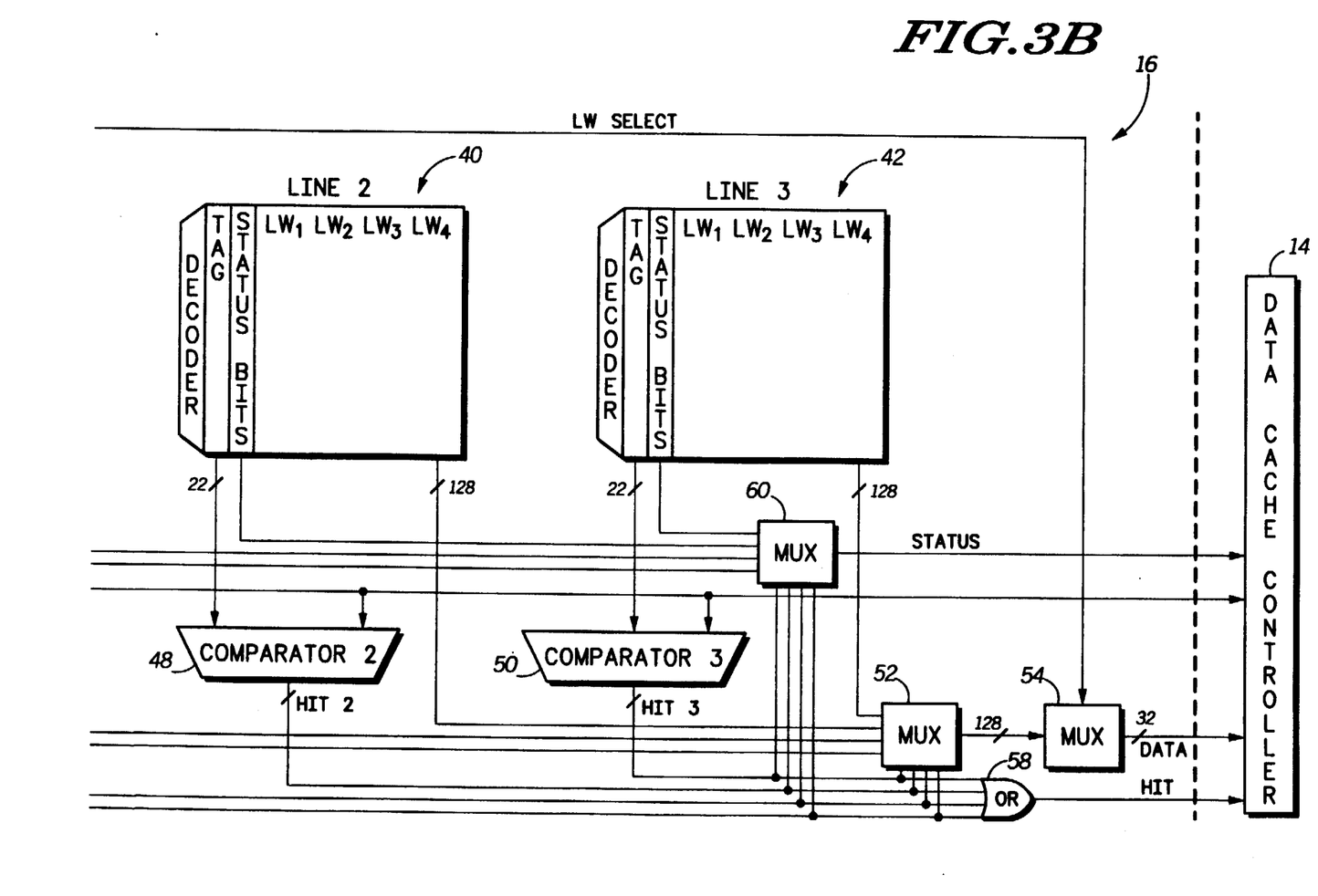

Shown in FIGS. 3A and 3B are block diagrams illustrating a preferred embodiment of write-back cache 16. FIG. 2 illustrates the proper orientation of FIGS. 3A and 3B. In the preferred embodiment, write-back cache 16 is comprised of paged memory management unit translation look-aside buffer (TLB) 34, four cache blocks 36, 38, 40, 42, four comparators 44, 46, 48 and 50, multiplexers (MUX) 52, 54, and 60, and an OR-gate 58. Each of the four cache blocks 36, 38, 40, and 42 contains sixty-four (64) sets of four (4), 16-byte data cache lines (LW1-LW4) 32, where each longword (LW) consists of 32 consecutive bits, for a total cache data storage of 4 KB. Accordingly, write-back cache 16 is organized as a 4-way set-associative cache, wherein the number of sets of each cache line is a function of the minimum page size of main memory 26.

In operation, write-back cache 16 is accessed by a physical address generated by paged memory management unit translation lookaside buffer (TLB) 34. The TLB 34 receives a logical page address 56 from CPU 12 and translates a predetermined number of the upper address bits of the logical address into a physical address. Logical page address 56 is comprised of two fields, a page frame and a page offset. The page frame contains the upper address bits of the logical page address 56, while the page offset contains the lower address bits. Due to transparent translation, the physical address and the logical address are the same for a predetermined number of the address bits of the page offset. The transparently translated physical address is used to access write-back cache 16. Accordingly, a predetermined number of the physical address bits contained in the page offset field (e.g. PA {9:4}) are used to select one of the 64 sets of write-back cache 16. Similarly, a predefined number of address bits from the page offset (e.g. PA {3:2}) are used to select the appropriate bits in the data cache line 32.

Figure 4:
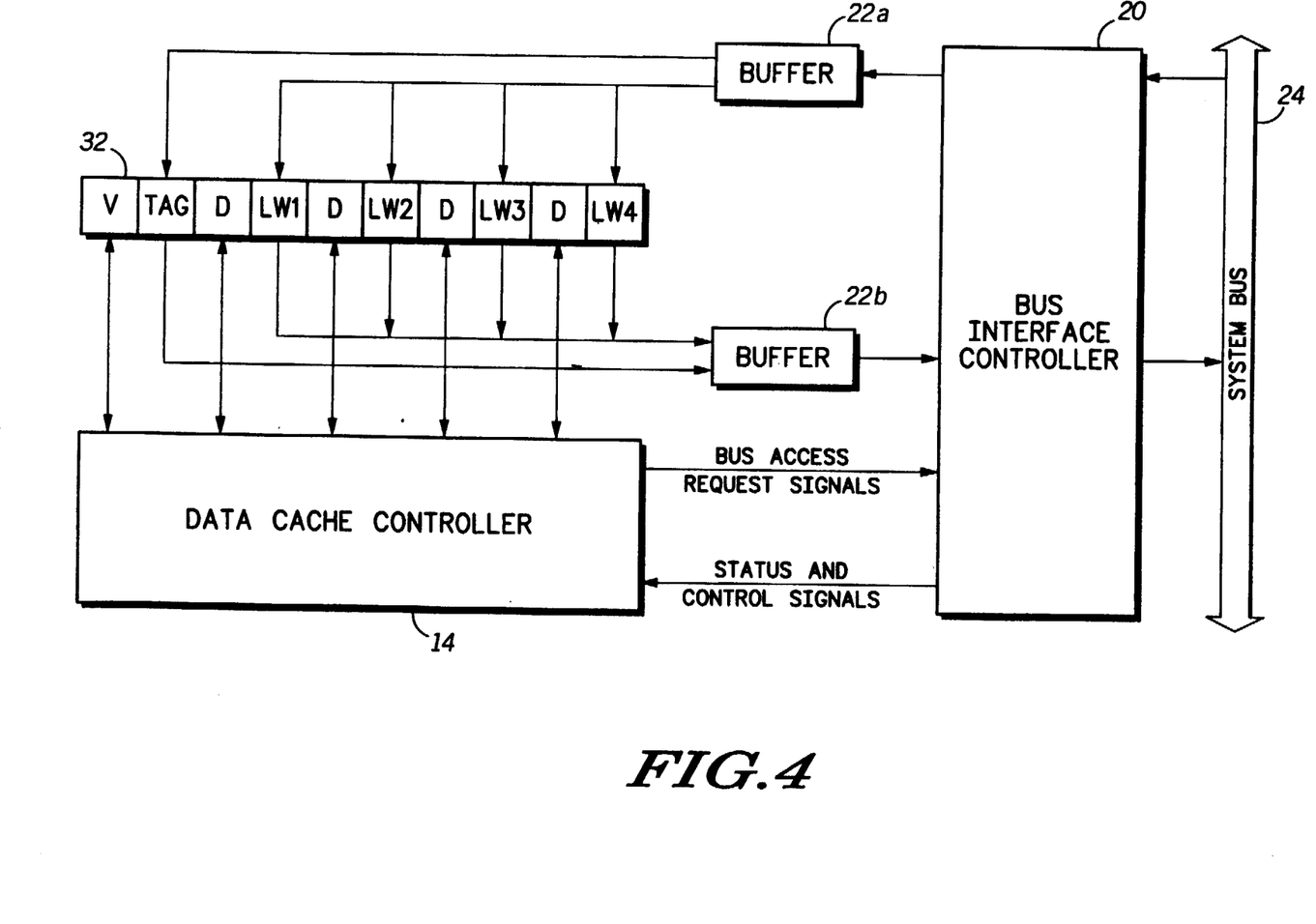
FIG. 4 is a block diagram illustrating a preferred embodiment of the data cache entry replacement scheme in write-back cache of FIGS. 3A and 3B.

Associated with each data cache line 32 of write-back cache 16 is an address tag (TAG) and status information. It should be noted that the orientation of the status information in the data cache line 32 is modified in FIG. 3A and 3B for illustrative purposes only. The status information for each data cache line 32 consists of the validity per line (first state entry), and the write status —"dirtiness" (second state entry) for each longword (LW) in the data cache entry 32. Accordingly, the data cache line 32 has a first VALID (V) bit and a DIRTY (D) bit associated with each longword (LW1-LW4), as illustrated in FIG. 4. There are three possible states for each data cache line 32, VALID, INVALID and DIRTY. When the VALID bit is clear, there is no data stored in the cache line, which signifies an INVALID state. When the VALID (V) bit is set, and no DIRTY bit is set, the entry in a data cache line is valid and contains data consistent with the data stored in main memory 26 at the corresponding memory location. When the VALID bit is set, and one of more DIRTY bit(s) are set, the data in the cache line is valid but inconsistent with the main memory 26.

A predetermined number of the upper bits of logical page address 56 (e.g. PA{31:13}) are translated by TLB 34, and combined with a predetermined number of bits from the page offset (e.g. PA {12:10}) to generate a PHYSICAL TAG ADDRESS. Since the page offset is available during the TLB 34 translation process, the translation of the logical address bits occurs concurrently with the access into the set array in write-back cache 16. The PHYSICAL TAG ADDRESS is routed to comparators 44, 46, 48 and 50, for comparison with the TAG address fields of each data cache line 32 from the selected set of cache lines (0-3). If one of the four comparators 44, 46, 48, or 50 indicates that the TAG address field for one of the data cache line 32 of the selected set of cache lines (0-3) matches the PHYSICAL TAG ADDRESS, and the status information for the matching data cache line 32 indicates the entry is valid, then a cache "hit" occurs, and a HIT signal is asserted. Alternatively, if none of the TAG address fields of the data cache line 32 from the selected set of cache lines (0-3) matches the PHYSICAL TAG ADDRESS, then a cache "miss" occurs, and the HIT signal is negated. Each of the four comparators 44, 46, 48, and 50 provide OR-gate 58 with their respective "hit" status. OR-gate 58 transfers a HIT signal to data cache controller 14 which reflects the status of the address comparison "hit" or "miss" (the complement of HIT, HIT*).

Each time CPU 12 transfers a data operand, the comparators 44, 46, 48 and 50 of write-back cache 16 will perform a comparison of the operand address (PHYSICAL TAG ADDRESS) with the various TAG address fields of lines (0-3), of the selected set, to determine if the requested operand is resident in write-back cache 16. A write access initiated by CPU 12, which "hits" in write-back cache 16, will cause the selected data cache line 32 to be updated with the data provided by CPU 12. Accordingly, CPU 12 will set the DIRTY bit for the appropriate data entry (LW1-LW4) in the data cache line 32 to indicate the data entry (LW1-LW4) has been modified. Since CPU 12 will not perform a contemporaneous bus write cycle to update main memory 26, the data stored in the modified cache line 32 is now inconsistent with the data stored at the corresponding memory location in main memory 26. Thus, at least a portion of data cache line 32 is in a DIRTY state. The modified data cache line 32 will remain in the DIRTY state until the DIRTY data entry is selected for replacement, or is invalidated by CPU 12.

Shown in FIG. 4 is a block diagram illustrating a preferred embodiment of the data cache entry replacement scheme for write-back cache 16. The occurrence of three events in write-back cache 16 triggers the data entry replacement scheme. Event 1 occurs when the address provided by CPU 12 "misses" in write-back cache 16, and the data cache line 32 to be replaced is DIRTY. Event 2 occurs when the address provided by CPU 12 "misses" in write-back cache 16, and the data cache line 32 to be replaced is VALID (clean). Event 3 occurs when the address provided by CPU 12 "hits" in write-back cache 16, causing a DIRTY bit to be set for the appropriate data entry (LW1-LW4) in the modified data cache line 32.

Essentially, Events 1 and 2 occur when the entry that CPU 12 attempts to write access is not resident in write-back cache 16, therefore causing a cache "miss" to occur. The only significant difference between the Event 1 cache "miss" and the Event 2 cache "miss" is the status of the data cache line 32 to be replaced. In the case of Event 1, one or more of the data entries (LW1-LW4) in the data cache line 32 to be replaced is (are) DIRTY, whereas in the case of Event 2, the data entry (LW1-LW4) in the data cache line 32 to be replaced is VALID (clean). The scenario described below illustrates the events which trigger the "miss" in write-back cache 16, however, the events which follow the detection of the cache "miss" depend upon the state of data cache line 32.

CPU 12 sends a requests to data cache controller 14 to write a data entry to write-back cache 16, at a given address. Data cache controller 14 waits for the TLB 34 to generate the PHYSICAL TAG ADDRESS (corresponding to the address provided by CPU 12), for comparison with each of the four TAG address fields for the selected set. Comparators 44, 46, 48, and 50 compare the PHYSICAL TAG ADDRESS with the respective TAG address fields for each data cache line 32 of cache lines (0-3) of the selected set. Once the comparison is complete, and no address match occurred, the "hit" status for each line is supplied to OR-gate 58. OR-gate 58 sends a "miss" (HIT*) signal to data cache controller 14. In response to receiving notification from OR-gate 58 that a cache "miss" occurred, data cache controller 14 generates a first REQUEST signal for bus interface controller 20, and stores the address for the requested cache line, along with various status information in an internal register (not shown), until the bus interface controller 20 accepts the REQUEST signal. Upon acknowledgement of the REQUEST signal by bus interface controller 20, data cache controller 14 transfers the address, status information and a read signal to the bus interface controller 20. The requested cache line is read from main memory 26, and written into a data cache line 32 in one of the cache lines (0-3) of the selected set.

In the case of an Event 1 cache "miss", concurrent with a first REQUEST signal, data cache controller 14 reads the DIRTY bits, contained in the modified data cache line 32, to determine whether the entire data cache line 32 should be written to memory, or alternatively, whether only one of the longword(s) LW1-LW4 should be written to memory. After reading the DIRTY bit(s) of the modified data cache line 32, data cache controller 14 determines the requisite size of the delayed write to memory. Simultaneously, the TAG address and required number of data entries (LW1-LW4) from data cache line 32 are readout by the data cache controller 14 and stored in push buffer 22b. Once the push buffer 22b is filled, data cache controller 14 generates a new REQUEST signal to bus interface controller 20, and clears the VALID bit, requesting a transfer (push) of the information stored in push buffer 22b. If only one (1) DIRTY bit was set, then the data cache controller 14 will send a REQUEST signal to the bus interface controller 20 for a longword push, however, if two (2) or more DIRTY bits were set, the data cache controller 14 will request a line push (burst transfer), and the entire data cache line 32 will be transferred to bus interface controller 20 upon acceptance of the request.

The replacement cache entry is transferred from main memory 26 to the bus interface controller 20, via the system bus 24, and loaded into buffer 22a. After buffer 22a is filled, the bus interface controller 20 is free to accept the push request made by data cache controller 14, and the data cache controller 14 is free to load write-back cache 16 with the replacement entry. Once the bus interface controller 20 accepts the push request, the TAG address and required number of data entries (LW1-LW4) from data cache line 32 are pushed out of buffer 22b into the bus interface controller 20. A minimum amount of the system bus 24 bandwidth is utilized, since only the DIRTY portions of data cache line 32 are "written-back" to main memory. Data cache controller 14 will wait for the bus interface controller 20 to accept the REQUEST signal. Accordingly, the data cache line 32 (or a portion thereof) remains stored in push buffer 22b until the push request is accepted by bus interface controller 20. A set of STATUS signals inform the data cache controller 14 of the status of any bus transfer requested by the data cache controller 14.

Data cache controller 14 proceeds to load write-back cache 16 with the replacement entry stored in buffer 22a. All DIRTY bits are set to their appropriate value for the newly modified data cache line 32. For example, in the case of a cache read "miss", where the DIRTY bits are cleared, and the VALID bit set, the data cache line 32 will end up in a VALID state. Conversely, in the case of a cache write "miss", the replacement cache line is merged with the new data provided by CPU 12, the VALID bit is set, and the appropriate DIRTY bits are set, leaving the cache line in a DIRTY state. In the case of a write "miss", the cache line will remain in the DIRTY state until it is either replaced, or invalidated by CPU 12.

In the case of an Event 2 cache "miss", data cache controller 14 will be informed by OR-gate 58 that the address provided by CPU 12 "missed" in write-back cache 16. Data cache controller 14 reads the status bits, contained in the selected data cache line 32, to determine if any of the data cache entries (LW1-LW4) are DIRTY. Once the data cache controller 14 determines that data cache line 32 is VALID, the address for the requested cache line, and various status information, are transferred to the data cache controller 14, and stored in an internal register. Accordingly, data cache controller 14 will send a REQUEST signal to bus controller 20, requesting the bus transfer. Once the bus controller 20 acknowledges the REQUEST signal, data controller 14 transfers the address for the needed cache line to the bus interface controller 20 with the command read this cache line from main memory 26.

If the Event 2 "miss" is caused by an attempt by CPU 12 to read access write-back cache 16, the needed cache line is read from main memory 26 and the required data is supplied to CPU 12. Essentially, the required data is transferred from main memory 26 to the system bus 24, and the bus interface controller 20 supplies the data to the CPU 12, via the internal bus 18. The replacement entry is loaded in the cache and the status of data cache line 32 will remain in the VALID state until written to by CPU 12. In the case where the "miss" is caused by a write access attempt by CPU 12, the needed cache line is read from main memory 26 and data cache line 32 is updated with the TAG and data obtained as a result of the bus cycle. The DIRTY bit(s) for the associated longword(s) are appropriately set, and all others (DIRTY bits) are cleared. The status of data cache line 32 will remain DIRTY until the DIRTY data cache entry is selected for replacement. Once data cache line 32 is selected for replacement, the replacement scheme described for Event 1 will occur.

In the case of a cache "hit" (Event 3), the entry that CPU 12 attempts to access is resident in write-back cache 16, therefore, OR-gate 58 notifies the data cache controller 14 of the cache "hit". If the "hit" occurs as a result of a CPU 12 read access, write-back cache 16 provides CPU 12 with the requested data operand via internal bus 18. If the "hit" occurs as a result of a CPU 12 write access, the selected data cache line 32 is modified with the data provided by CPU 12, and the DIRTY bit(s) are set for the appropriate longword(s) (LW1-LW4). The status of the modified data cache line 32 will remain the same until the occurrence of Event 1 or 2, at which time the DIRTY portion of the data cache line 32 will be replaced, using the replacement scheme described for Event 1 or 2.

Essentially, the data entry replacement scheme is the same regardless of the Event which triggers the actual replacement process. In order to insure full usage of write-back cache 16, the first of cache lines (0-3) which is INVALID, in the selected set, is used for loading the replacement entry (requested cache line). If no line in the set is INVALID, a replacement algorithm determines which line is replaced. Generally, the replacement algorithm will select an entry for replacement independent of the state of the DIRTY bits. The actual loading sequence of the write-back cache 16 with the replacement entry depends, however, upon whether the "miss" in write-back cache 16 occurred as a result of a read or write access by CPU 12.

While the present invention has been described in a preferred embodiment, it will be apparent to those skilled in the art that the disclosed invention may be modified in numerous ways and may assume many embodiments other than that specifically set out and described above. The optimum number of DIRTY bits is the size of the cache entry divided by the maximum size of a single transfer to memory further modified by bus transfer overhead and status field space limitations, which are dependent on the embodiment. Accordingly, the size of the status fields may be increased to provide the data cache controller 14 with additional information, thereby further minimizing the number of memory accesses used to unload DIRTY data. Furthermore, write-back cache 16 may be an external cache coupled to the CPU 12 via the system bus 24. Accordingly, it is intended by the appended claims to cover all modifications of the invention which fall within the true spirit and scope of the invention.

We claim:

1. A data processing system, comprising:
   a data processor;
   a memory for storing a plurality of data entries, identified by a plurality of memory addresses, and for providing said data entries to said processor;
   a first communications bus, for transferring said plurality of data entries between said memory and said data processor, in response to a first control signal;
   a bus controller;
   a cache, coupled to said memory and said data processor, for storing in each of a plurality of cache lines an addressable data cache entry comprised of a plurality of data words, where each data word contains a plurality of bits, said cache receiving from said data processor a modified data entry, in a first write mode, and transferring at least one of said plurality of data words to said memory, in a second write mode, said cache comprising: storage means for storing in each of said plurality of cache lines said addressable data cache entry containing said plurality of data words, and for storing a first state bit indicating that said cache line is valid, and a predetermined number of second state bits, each second state bit indicating whether a particular data word in said addressable data cache entry is consistent or inconsistent with a data entry at a memory address corresponding in memory location to said addressable data cache entry;

first means, coupled to said cache and said bus controller, for receiving said modified data entry from said cache, and for transferring a selected number of said plurality of data words in said modified data entry to said memory, when said second state bits indicate that a predetermined number of said plurality of data words is inconsistent with said data entry at said memory address corresponding in location to said addressable data cache entry, and for receiving a plurality of replacement data entries from said memory, and transferring said replacement data entries to said storage means; and cache controller means, coupled to said first means, and said storage means, for reading each of said second state bits, and for determining said selected number of data words in said modified data entry to be transferred to said memory, said cache controller means controlling the transfer of said selected number of data words in said modified data entry to said memory, and for controlling the transfer of said plurality of replacement data entries from said first means to said cache.

2. The data processing system of claim 1 wherein said cache stores said modified data entry received from said processor in at least one of said plurality of cache lines.

3. The data processing system of claim 1 wherein said bus controller is coupled to said first communications bus, said cache, and said cache controller means.

4. The data processing system of claim 1 wherein said first means for transferring said selected number of data words in said modified data entry comprises buffer means, coupled to said bus controller, for storing said replacement data entry received from said memory, in a first mode of operation, and for storing at least one of said data words received from said cache, in a second mode of operation.

5. The data processing system of claim 1 wherein said cache controller means receives a plurality of control signals from said bus controller and said processor, and controls the tranfer of data between said cache, said bus controller and said processor, in response to said plurality of control signals.

6. In a data processing system, a cache for storing a plurality of addressable data entries in a plurality of cache lines, with each of said plurality of addressable data entries containing a plurality of data words, and for selectively transferring at least one of said plurality of data words of an addressable data entry to a memory, via a communications bus, when at least one of said plurality of data words of said addressable data entry is inconsistent with a data entry stored at a memory address corresponding in memory location to said addressable data entry, said cache comprising:

storage means for storing each of said plurality of addressable data entries, with each of said plurality of addressable data entries being a copy of said data entry stored in said memory at said corresponding memory address, said storage means storing for each addressable data entry a first state bit indicating that said addressable data entry is valid, and storing a predetermined number of second state bits for each addressable data entry, each second state bit indicating whether a particular data word in said addressable data entry is consistent or inconsistent with said data entry at said corresponding memory location in said memory;

means, coupled to said storage means, for transferring a selected number of said plurality of data words in said addressable data entry to said memory, when said second state bits indicate that a predetermined number of said plurality of data words is inconsistent with said data entry stored at said corresponding memory address in said memory, and for receiving a plurality of replacement data entries from said memory to update said cache line, comprising:

buffer means for temporarily storing said selected number of data words, for transfer to said memory, in a first mode, and for temporarily storing a replacement data cache entry, received from said memory, in a second mode; and control means, coupled to said storage means, for enabling and disabling said storage means, and for providing a plurality of control signals to enable transfer of said selected number of data words from said storage means to said memory, in said first mode, and to transfer said replacement data cache entry from said memory to said storage means, in said second mode.

7. The data processing system of claim 6 further comprising a processor coupled to said control means, for modifying said plurality of addressable data entries in said cache, said processor modifying said second status bits for each of said particular data words in said plurality of addressable data entries modified by said processor, to indicate that said particular data word is inconsistent with said data entry at said corresponding memory address in said memory.

8. The data processing system of claim 6 wherein said processor changes the status of said second state bits to notify said control means that upon replacement said selected number of data words in said addressable data entry must be transferred to said memory, in said first mode.

9. A cache memory system, for storing a plurality of addressable data cache entries in a plurality of cache lines, with each of said plurality of addressable data cache entries containing a plurality of data words said cache memory system selectively transferring at least one of said plurality of data words in an addressable data entry to a memory, via a communications bus, when at least one of said plurality of data words is inconsistent with a data entry stored at a memory address corresponding in memory location to said addressable data entry, said cache memory system, comprising:

storage means for storing each of said plurality of addressable data cache entries, with each of said plurality of addressable data cache entries being a copy of said data entry contained in said corresponding memory location in said memory, said storage means storing a first state bit indicating that said addressable data entry is valid, and storing a predetermined number of second state bits for each addressable data entry, each second state bit indicating whether a particular data word in said addressable data entry in consistent or inconsistent with said data entry stored at said corresponding memory location in said memory; and means for transferring a selected number of said plurality of data words in said addressable data entry to said memory, when said second state bits indicates that a predetermined number of said plurality of data words is inconsistent with said data entry at said corresponding memory address, and for receiving a plurality of replacement data entries from said memory to update said cache line.

10. The cache memory system of claim 9 wherein said means for transferring a selected number of said plurality of data words in said addressable data entry comprises:

buffer means for temporarily storing said selected number of data words, for transfer to said memory, in a first mode, and for temporarily storing a replacement data cache entry, received from said memory, in a second mode; and control means, coupled to said storage means, for enabling and disabling said storage means, and for providing a plurality of control signals to enable transfer of said selected number of data words from said cache to said memory, in said first mode, and to transfer said replacement data cache entry from said memory to said storage means, in said second node.

* * * * *

UNITED STATES PATENT AND TRADEMARK OFFICE
CERTIFICATE OF CORRECTION

PATENT NO. : 5,155,824

DATED : October 13, 1992

INVENTOR(S) : Robin Wayne Edenfield et al.

It is certified that error appears in the above-identified patent and that said Letters Patent is hereby corrected as shown below:

In claim 5, column 9, line 44;
 change "tranfer" to --transfer--

In claim 9, column 10, line 61;
 change "in" to --is--

In claim 10, column 12, line 10;
 change "node" to --mode--

Signed and Sealed this

Second Day of November, 1993

*Attest:*

BRUCE LEHMAN

*Attesting Officer*     *Commissioner of Patents and Trademarks*